US011501278B2

(12) United States Patent
Lee

(10) Patent No.: US 11,501,278 B2
(45) Date of Patent: Nov. 15, 2022

(54) INTERNET OF THINGS (IOT) BOX FOR MOBILE PAYMENT RETAIL SYSTEM AND IN STORE MOBILE CHARGING SOLUTION

(71) Applicant: KoamTac, Inc., Princeton, NJ (US)

(72) Inventor: Hanjin Lee, Skillman, NJ (US)

(73) Assignee: KoamTad, Inc., Princeton, NJ (US)

(*) Notice: Subject to any disclaimer, the term of this patent is extended or adjusted under 35 U.S.C. 154(b) by 33 days.

(21) Appl. No.: 16/739,954

(22) Filed: Jan. 10, 2020

(65) Prior Publication Data
US 2021/0042730 A1   Feb. 11, 2021

Related U.S. Application Data

(60) Provisional application No. 62/884,927, filed on Aug. 9, 2019.

(51) Int. Cl.
*G06K 5/00* (2006.01)
*G06Q 20/32* (2012.01)
*G06Q 20/20* (2012.01)

(52) U.S. Cl.
CPC ....... *G06Q 20/3223* (2013.01); *G06Q 20/202* (2013.01); *G06Q 20/204* (2013.01); *G06Q 20/3278* (2013.01)

(58) Field of Classification Search
CPC ............ G06Q 20/3223; G06Q 20/202; G06Q 20/204; G06Q 20/3278; G06Q 20/40; G06Q 20/405; G06Q 20/322; G06F 17/3244
USPC ....................................... 235/380, 383, 385
See application file for complete search history.

(56) References Cited

U.S. PATENT DOCUMENTS

| | | | |
|---|---|---|---|
| 8,831,514 B2* | 9/2014 | Tysowski | H04W 4/50 455/41.1 |
| 9,949,065 B1* | 4/2018 | Zarakas | G06Q 20/327 |
| 11,023,881 B2* | 6/2021 | Zhao | G06Q 20/085 |
| 2016/0171502 A1* | 6/2016 | Maenpaa | G06Q 20/327 705/44 |
| 2017/0200152 A1* | 7/2017 | Winkler | G06Q 20/204 |
| 2018/0165678 A1* | 6/2018 | Kajal | G06Q 20/34 |
| 2018/0240088 A1 | 8/2018 | Nelms et al. | |
| 2019/0043310 A1* | 2/2019 | Higgins | G07F 17/34 |
| 2019/0347626 A1* | 11/2019 | Wullschleger | G06Q 20/3278 |

* cited by examiner

*Primary Examiner* — Daniel St. Cyr
(74) *Attorney, Agent, or Firm* — Robert Gorman; Gorman Law Offices

(57) ABSTRACT

Systems and methods for conducting sales transactions are provided. Embodiments include portable, electronic, point of purchase devices configured to acquire identification information from articles to be purchased, to determine a purchase price, and to acquire payment information for the purchase price. The point of purchase devices may include one or more input devices such as a communication device, a camera, a scanner, and a sensor system for acquiring identification information and/or the payment information. The point of purchase devices also may contain an electronic display, communication interfaces (such as a near field communication interface, a local area network interface, Bluetooth® configurations, etc.) for transmitting and/or receiving information to/from connectable devices such as a mobile phone, BLE beacon and/or an external server. Additional provision is made for an embodiment that avoids battery depletion anxiety by shoppers, through the provision of a handheld portable charging point device.

8 Claims, 13 Drawing Sheets

INTERNET OF THINGS (IOT) BOX FOR MOBILE PAYMENT RETAIL SYSTEM AND IN STORE MOBILE CHARGING SOLUTION

The present application claims priority from U.S. provisional application No. 62/884,927, filed on Aug. 9, 2019, which is hereby incorporated by reference in its entirety.

BACKGROUND OF THE INVENTION

1. Field of the Invention

The present disclosure relates generally to handheld electronic devices and more particularly, to electronic devices configured to conduct sales transactions. Within this vein, the present invention relates in certain embodiments to a portable, Internet of Things (IoT) based self-checkout terminal with improved mobile payment options.

2. Description of the Related Art

Systems of using mobile devices (smartphones, tablets, etc.) for mobile payment at a point of sale are known. Such techniques include, for example, scanning a barcode with a mobile device from a display at the cash desk, or displaying a numeric code, a barcode or a two-dimensional code on a mobile device typed in or scanned by the cashier, or tapping a mobile device which supports a Near-Field-Communication (NFC) standard on a terminal supporting the same standard.

These types of systems purport to offer a convenient and fast checkout experience for a customer, typically involving a self-checkout whereby a user utilizes a mobile device to collect product identification and pricing information. At checkout, the user presents the mobile device to the legacy scanning system of the retail establishments wherein barcodes or other graphic information symbols are presented to the scanner, enabling quick checkout. However, in order to be effective, such systems require that the mobile device have an application ("app") from the store downloaded on their device. Many users are reluctant to download apps for individual stores for various reasons, including inconvenience, as well as for privacy concerns.

Moreover, some of the systems and solutions described above require additional customer actions in the course of the purchasing and/or checkout processes, and cannot prevent a customer from passing through the checkout with unpaid items which have not been detected. Many known systems for payment verification and checkout upon leaving a store require the customer still to place his items on a checkout belt or the like, and the customer or cashier has to scan the items and at least the items have to be packed again into a cart, a basket or a bag, such that the claimed time advantage is hardly noticeable in the overall checkout process. Therefore, such systems require additional control staff and/or complex and burdensome technical means like weighing systems. In any case, several manual and time-consuming processes have to be done by the customer for a self-checkout. Hence, these types of systems fail to meet the requirement for a more convenient and faster mobile payment technique which actually provides for the claimed advantages of such systems. Alternatively, some known systems are of the "scan and go" variety which might obviate some of the above-referenced disadvantages, however these systems typically perform random verification for select (pre-identified) customers, and as such, are subject to losses, and are exclusively predicated on the store application downloaded on a customer's phone, and similar problems are also reported with "autonomous shopping" systems as currently known.

Given such inefficiencies, customers and merchants call into question the benefit of mobile payment techniques via mobile devices up to now, and request more convenient, faster mobile payment techniques.

Accordingly, there is still a demand to enable real self-checkout with mobile payment, such as in a self-checkout with cashless and card less payment by a mobile payment service in a retail shop, in which the customer is not required to perform additional actions in the course of the purchasing and/or checkout processes.

Yet further demand exists for an augmented in store mobile commerce solution and charging system. By way of background, it is estimated that approximately 80% of shoppers in employ their mobile devices in brick and mortar stores. The ability for customers to use their mobile phones during shopping has become important, so much so that out of that 80% of shoppers, it is estimated that 60% of shoppers experience what is termed "battery anxiety" when the battery charge on their mobile devices becomes depleted. This dramatically shortens the consumer stay time in physical stores and has a very negative effect on in-store purchases as consumers typically exit the store prematurely in order to recharge their mobile device elsewhere.

Accordingly, there is a need to provide an in store mobile charging solution in order to avert battery anxiety and so as to increase instore purchases. Additionally, there is a need for augmenting such a solution with a complete digital experience that offers the in-store consumer the ability to look up and locate in-store products on their mobile devices, and for provision of product scanning and paying for the same all from their mobile device. Such a solution bridges the gap between traditional in-store shopping and a fully automated check-out solution.

SUMMARY

The one embodiment of the present disclosure generally relates to a system and techniques for performing point of sales (POS) transactions using a portable device (box) within an Internet of Things (IoT) type system which obviates the aforementioned disadvantages. More specifically, the present invention relates to a handheld portable point of purchase device (referred to as an IoT box herein) having methods, including an automated shopping app launch module for automatically initiating and displaying, on an electronic display on the IoT box, a given store app which can interface with a user's mobile device so as to enable a self-checkout with various mobile payment modalities, all without the need to download a given store app on a user's mobile device. In providing this, the present invention is a portable IoT box centric system that can be predicated on existing Bluetooth® or Bluetooth Low Energy (BLE) beacon architectures, and which in an illustrative embodiment enables cashless payments (and in an optional embodiment, card less payments), across completely different electronic payments regimes (AliPay®, ApplePay®, Samsung Payer®, Google Pay®, etc.), without the need for downloading store-specific apps, and without the need for fixed scanners at checkout stations. The IoT box has the flexibility to permit the point of sale (POS) application from the different electronic payment systems to be run on the customer mobile device as a typical arrangement, or on the IoT box itself as an alternative arrangement. Either way, an additional store-specific app download on the customer mobile device is not required (although is compatible with such download if desired), in order that the full range of user preferences may be provided for therewith.

In accordance with one disclosed embodiment, a portable electronic device may be capable of completing an entire sales transaction including ringing up articles of merchandise, receiving payment information, and communicating with an external server to receive authorization for payment. The electronic device may include input devices, such as a near field communication (NFC) interface, camera, and scanner, for retrieving article information and payment information. The electronic device also may use a device identification networking protocol to establish a communication link with another device in order to receive payment information. A software application of the device, or more typically, on the customer mobile device, may calculate the amount due and may retrieve inventory and price information from the merchant's server.

The electronic device also may include one or more communication interfaces at a physical checkout lane for communicating with the merchant's server when relaying item check out confirmation and payment confirmation, including in one embodiment, a Quick Response (QR) code or barcode that serves as confirmation of payment that can be automatically read electronically at the physical checkout lane. Further aspects at the physical checkout lane may provide for automatic verification of items being brought through the physical checkout lane.

In an additional embodiment of the present invention, a system and techniques for provision of a handheld portable charging point device that can overcome the aforementioned "battery anxiety" and the consequential diminishment of in store sales by such affected consumers. At its broadest, the handheld portable charging point device has a versatile casement structure and a mobile device retention structure for holding onto a user's mobile device, and includes a rechargeable battery and recharge interface for charging the user's mobile device; and when the rechargeable battery of the handheld portable charging point device needs recharging, it can be docked at a power outlet, wired or wireless electronic contact point, or at a lockable or anti-theft alarm sensor-enabled charging interface or charging station. An optional electronic display is attached for purposes of locking/unlocking the device, app usage, and/or, when combined with a payment interface (such as a scanner, physical credit card processing interface, or a displayed virtual payment interface) for direct purchase with or without kiosks and registers. By way of an additional augmentation, the charging interface may optionally include circuitry for variable speed (slow, fast) charging options, as well as add-on features such as bio sensors and antimicrobial features. Yet further embodiments may provide for an optional "green charging" option which utilizes the motion of an accompanying shopping cart upon which the handheld portable charging point device has been placed, to charge the rechargeable battery of the device and/or directly charges a user's mobile device when it is held by the same.

Certain aspects of embodiments disclosed herein by way of example herein are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below. Various refinements and additional features of the features noted above may also be incorporated and may exist individually, or in any combination thereof.

BRIEF DESCRIPTION OF DRAWINGS

These and other features, aspects, and advantages of the present disclosure will become better understood when the following detailed description is read with reference to the accompanying non-limiting drawings in which like characters represent like parts throughout the drawings, wherein.

Figure 1:
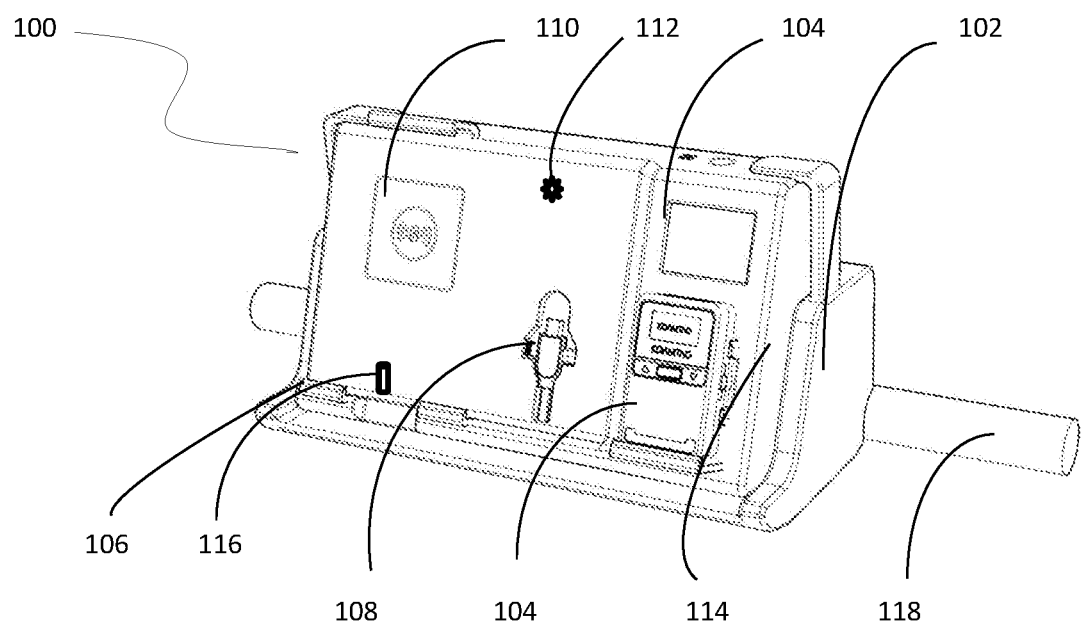
FIG. 1 shows a diagram illustrating an exemplary embodiment of an electronic device ("IoT Box for Mobile Payment") centerpiece of the self-checkout system according to the present invention.

In the drawings, it is noted that lines/arrows interconnecting individual blocks or entities are generally meant to illustrate an operational coupling there-between, which may be a physical and/or logical coupling, which on the one hand is generally implementation-independent (e.g. wired or wireless) and on the other hand may also comprise an arbitrary number of intermediary functional blocks or entities not shown.

DETAILED DESCRIPTION OF DRAWINGS AND EMBODIMENTS

The present invention is described herein with reference to particular non-limiting examples and to what are presently considered to be conceivable embodiments of the present invention. A person skilled in the art will appreciate that the present invention is by no means limited to these examples, and may be more broadly applied. Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

According to illustrative embodiments of the present invention, in general terms, a system and method is provided for enabling self-checkout with mobile payment, such as in a self-checkout with cashless and card less payment. Such payment transactions do not require cash and/or a debit card, credit card or the like for purchasing items at a point of sale in a retail shop, although alternative provision is made herein for those modalities of payment as well. Typical electronic payment transactions can be processed by way of mobile payment systems, such as Google Pay®, AliPay®, ApplePay®, etc. In doing so, the present invention provides for enabling real self-checkout with mobile payment whereby the customer is not required to perform additional actions in the course of the purchasing and/or checkout processes, including dispensing with the need to download a store app on the mobile device being used.

FIG. 1 shows a schematic diagram illustrating one illustrative example of the IoT box 100, which is the centerpiece of the overall self-checkout system according to the present invention. As shown in FIG. 1, is at its simplest level, a versatile casement structure that may be boxlike (or other shape) that contains a scanner 102, a display 104, an optional mobile phone/device docking station 106 with optional wireless (induction) or as depicted, wired charging 108, optional NFC module 110, optional speaker 112, optional GPS 114, and optional charging pin 116. As used herein, the structure of the casement is versatile, meaning that it may present itself in various practical forms as appreciated by those skilled in the art, which in one embodiment may entail structure of varying shape, large enough to retain desired elemental components such as a rechargeable battery, charging and/or recharging interfaces, any communication modules and/or electronic display and mobile device docking station or retention structure.

Although not illustrated, the electronic device also may include one or more communication interfaces for communicating with the merchant's server over a wireless network, personal area network, near field communication channel, or the like. In certain embodiments, the electronic device may use a smart selection method to determine the most suitable communication interface based on data transmission speed, security features, and other user preferences. The electronic device also may include applications for performing various personalized and location-based services such as product location information, product information, and merchant rewards program.

Figure 2:
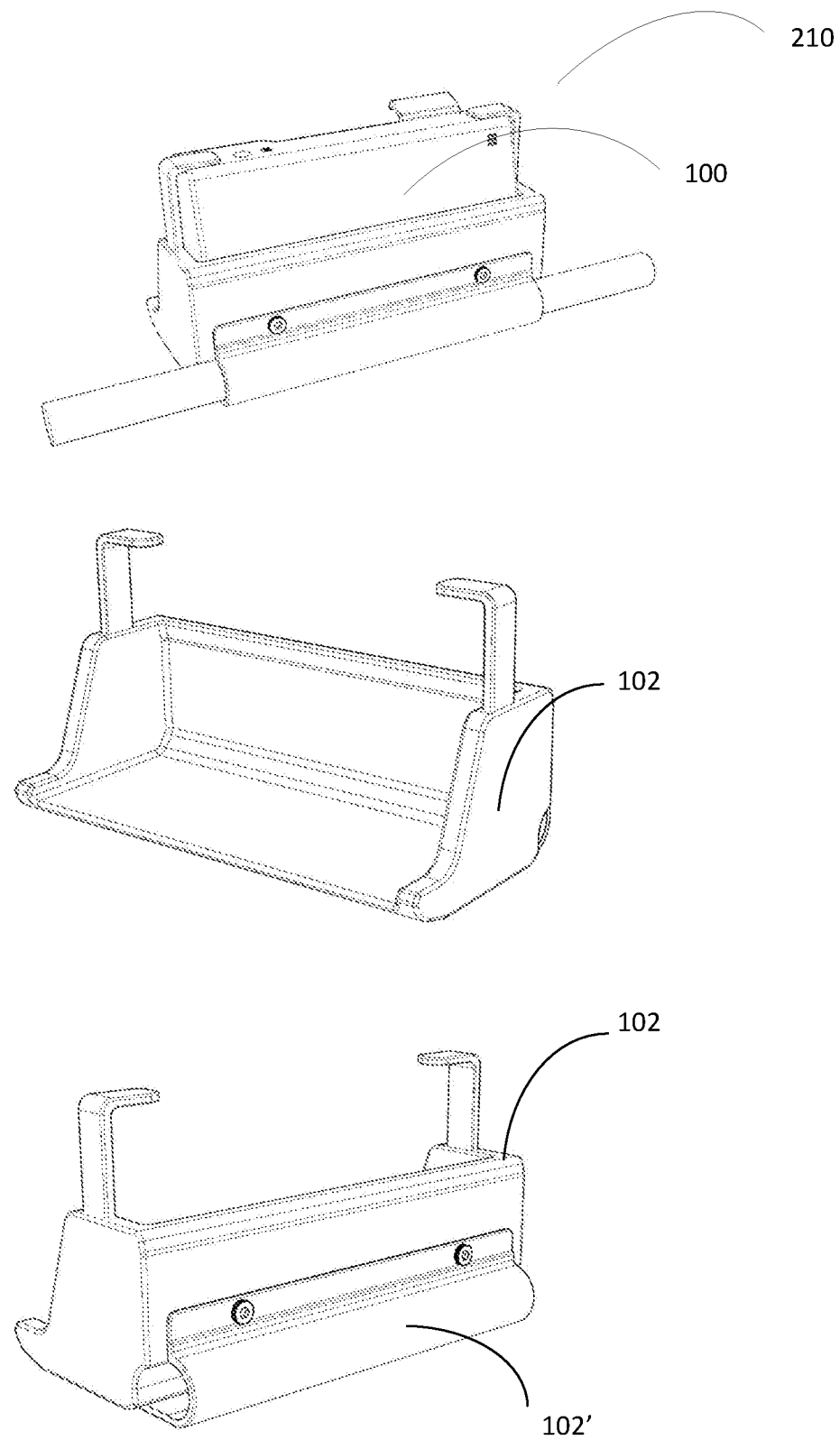
FIG. 2 shows a diagram illustrating an example of an optional cradle that can be used to receive and frictionally retain the illustrative IoT Box for Mobile Payment.
Figure 3:
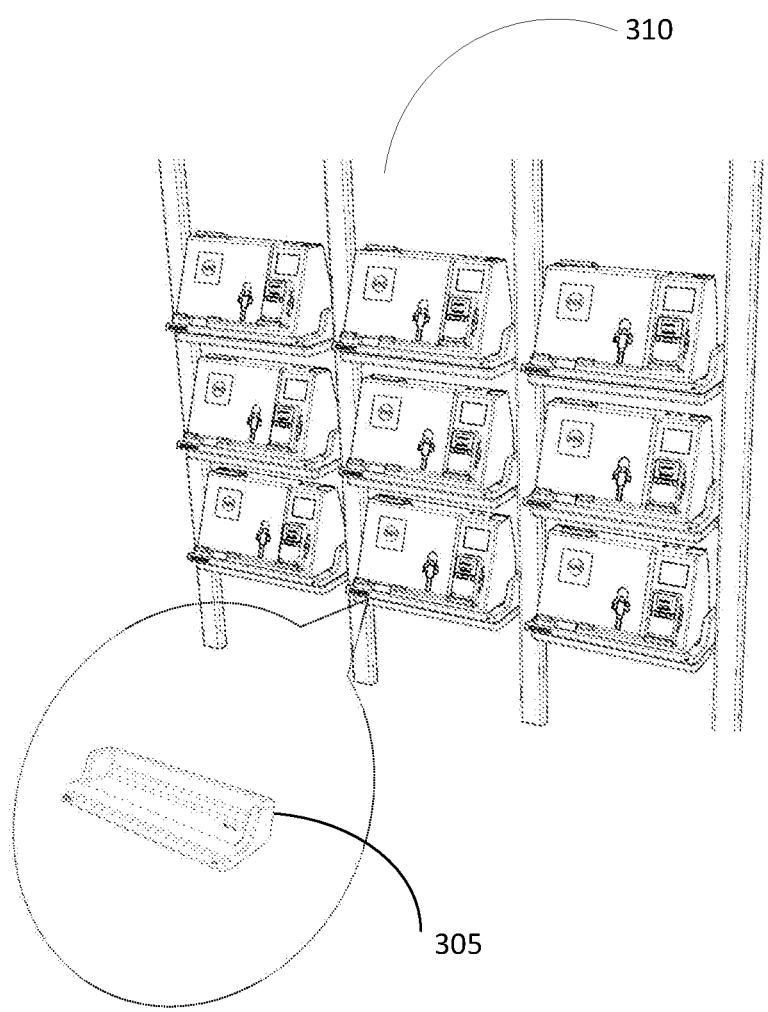
FIG. 3 shows a diagram illustrating an example of an optional charging station that can be used to store illustrative IoT Boxes for Mobile Payment when not in use by a customer.

FIG. 2 shows a schematic diagram illustrating one illustrative example of the IoT box cradle 150 that can be used to receive and frictionally or otherwise retain IoT box 100 on a shopping cart or the like. As can be appreciated, its exact form can vary widely, and is an optional aspect meant for easy placement and retention of IoT box 100 once a customer has decided to use the device by taking it from the rack or charging station 190 shown in FIG. 3 that normally would store the devices before and after use.

Figure 4:
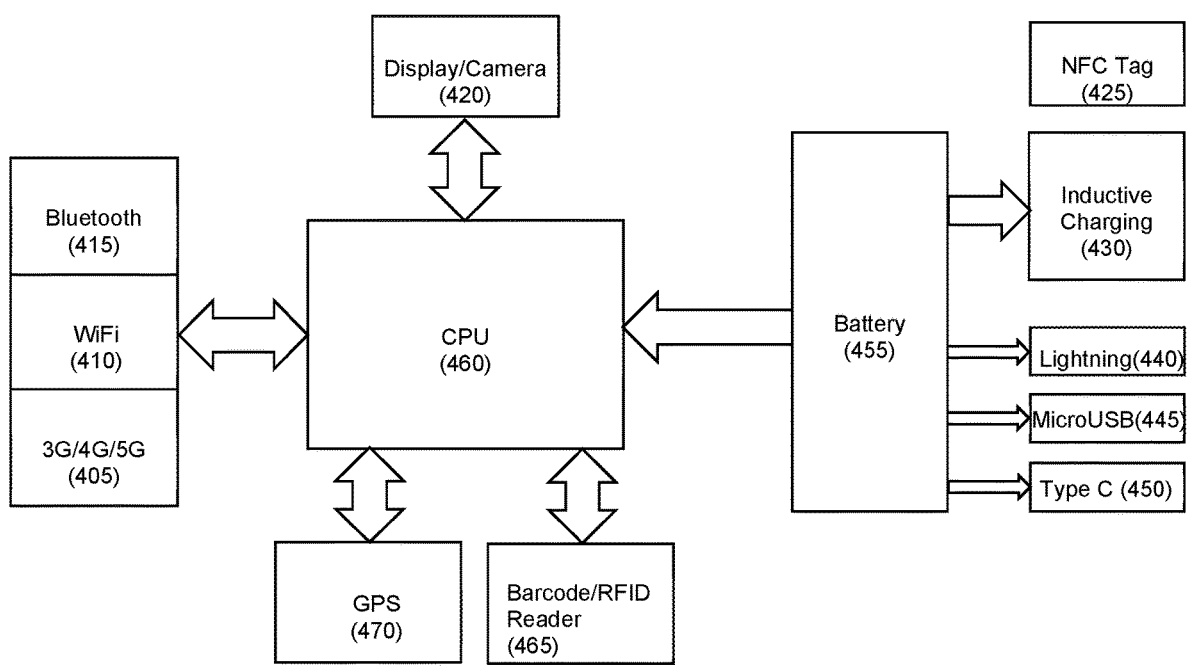
FIG. 4 shows a schematic illustrating an example of the electronic architecture within an IoT Box for Mobile Payment.

FIG. 4 shows a schematic illustrating an example of the electronic architecture within an IoT Box for Mobile Payment, wherein the operation of the device 100 may be controlled by a central processing unit (CPU) 450 and a control circuit (not depicted) that provide the processing capability required to execute the operating system, programs, display 104, and any other functions of the device 100. The CPU 450 may include a single processor or it may include a plurality of processors. For example, the CPU 50 may include "general purpose" microprocessors, a combination of general and special purpose microprocessors, instruction set processors, graphics processors, video processors, and/or related chips sets, but in one embodiment provides for a special purpose microprocessor. The control circuit may include one or more data buses for transferring data and instructions between components of the device 100. The control circuit also may include on board memory for caching purposes. In certain embodiments, the storage may include an image-processing program for extracting textual or encoded information from an image. For example, the image-processing program may be used to extract credit card information from a picture of the credit card. In another example, the image-processing program may be used to identify an article from the store database using the picture of the article. The long-term storage may be non-volatile memory such as read only memory, flash memory, a hard drive, or any other suitable optical, magnetic, or solid-state computer readable media, as well as a combination thereof.

One or more communication modules (interfaces) may provide connectivity channels for receiving and transmitting information. These modules may include wired and wireless (Bluetooth®, BLE, NFC, etc.) connectivity. In the case of one modality, NFC, it may be used to pair IoT box 100 with a customer mobile device, and may also be used as a prompt for automatically launching the respective store app on display 104, as well as for other communication needs. Close range communication may occur through the near field communication (NFC) module in IoT box 100. The NFC module may operate in conjunction with the NFC interfaces of neighboring devices such as mobile devices, etc. to allow for close range communication. The NFC module may exist as a separate component, may be integrated into another chipset, or may be integrated with the NFC device, for example, as part of a system on a chip (SoC). The NFC interface may include one or more protocols, such as the Near Field Communication Interface and Protocols (NFCIP-1) for communicating with another NFC enabled device. The protocols may be used to adapt the communication speed and to designate one of the connected devices as the initiator device that controls the near field communication.

An important feature in the above hardware particulars is special purpose circuitry that is situated within IoT box 100, and is connected to CPU 450 and the communication modules above, in order that automated shopping app launch module can automatically initiate and display (on electronic display 104 on IoT box 100), a given store app which can interface with a customer's mobile device. This special purpose circuitry is structured so as to receive a special signal generated by the pairing of IoT box 100 and customer's mobile device, which prompts a routine to pull updated app information from a store server or the like via the communications module described above. This enables the automatic app launch, which, when combined with communication with customer's mobile device, obviates the need to have the given app downloaded on a customer's mobile device, thereby enabling "store app download"-free self-checkout.

An input/output (I/O) controller (not depicted) may provide the infrastructure for exchanging data between the control circuit and the input/output devices, such as the display 104, scanner 102, etc. The I/O controller may contain one or more integrated circuits and may be integrated within the control circuit or exist as a separate component. The I/O controller also may provide the infrastructure for communicating with external devices through the I/O ports (not depicted) and may be used for connecting the device 100 to an external computer, or the like.

IoT box 100 may include a power source such as a Li-Ion battery, which may be user-removable or secured to the enclosure. In certain embodiments, the proprietary connection a pogo pin (or alternatively, a USB or other wired cable, as well as inductive charging methods) may be used may be used to connect the device 100 to a power source at charging station 190 for recharging the battery.

Figure 5:
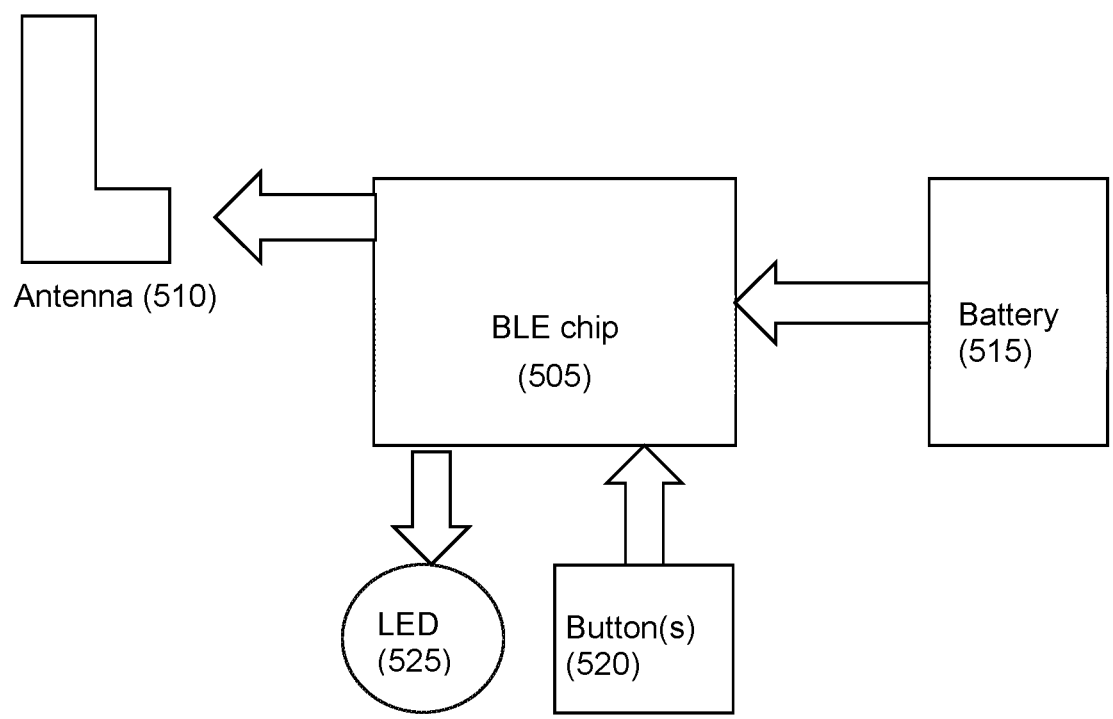
FIG. 5 shows a schematic illustrating an example of an optional BLE beacon that can be used by an illustrative IoT Boxes for Mobile Payment when communicating within an IoT environment in a store.

FIG. 5 shows a schematic illustrating an example of an optional BLE beacon with a special purpose BLE chip and accompanying antenna that can be used by an illustrative IoT Boxes for Mobile Payment when communicating within an IoT environment in a store.

Figure 6A:
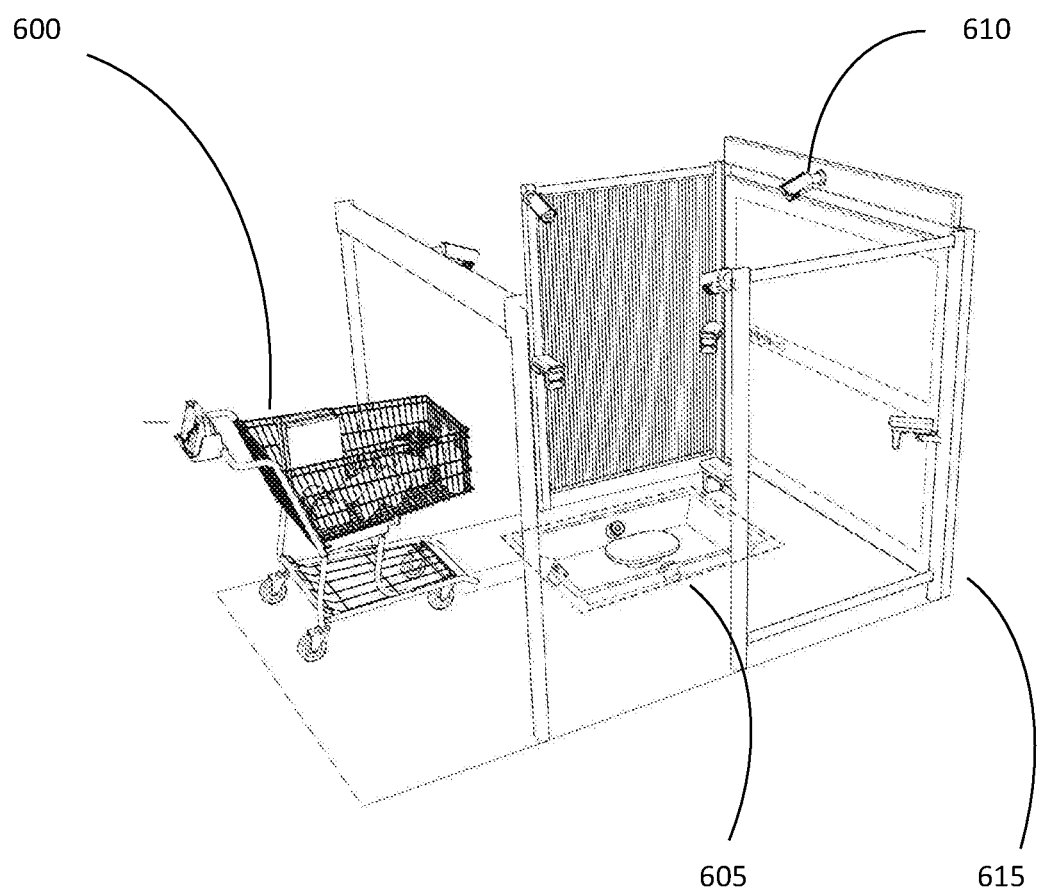
FIGS. 6A and 6B show a diagram illustrating an example of an optional self check out station that can augment the illustrative IoT Boxes for Mobile Payment by providing a checkout lane that can verify both payment and items carried through the lane in an automated electronic fashion.
Figure 6B:
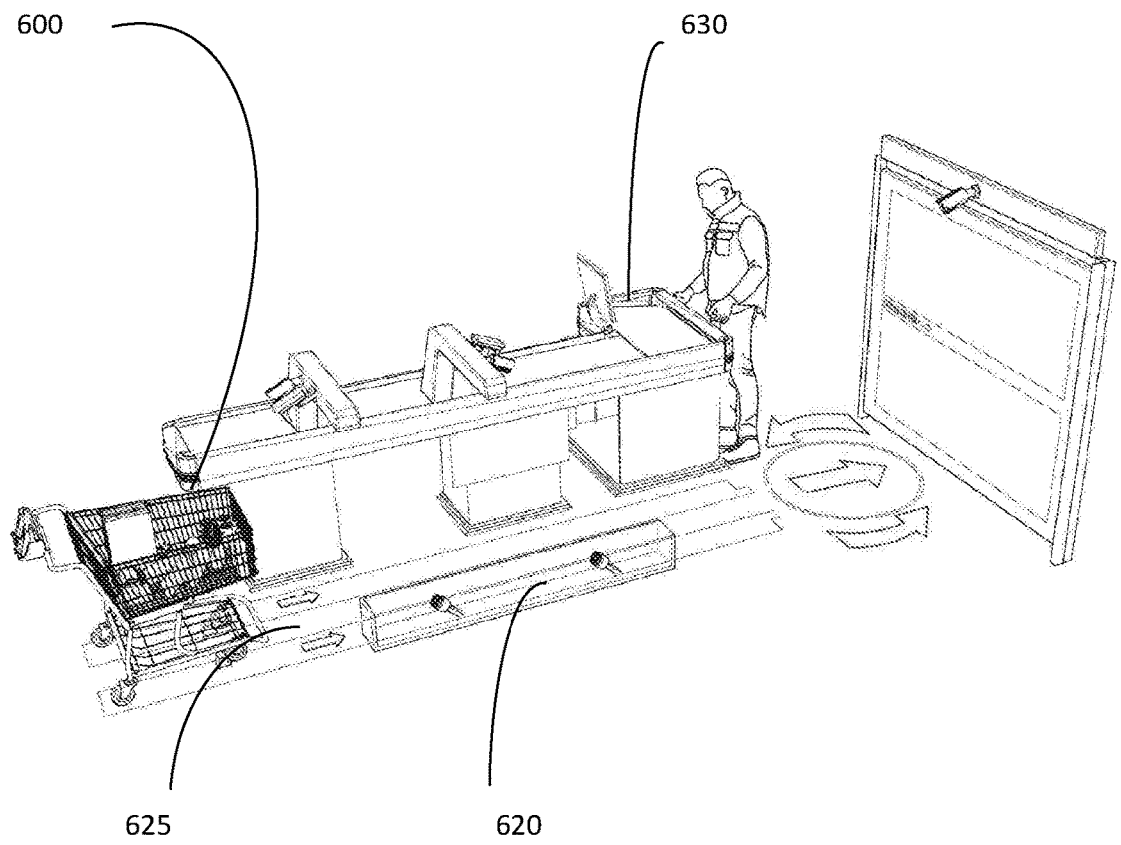

FIGS. 6A and 6B illustrate, respectively, examples of fixed and moving self check out stations that can augment the illustrative IoT Boxes for Mobile Payment by providing a checkout lane that can verify both payment and items carried through the lane in an automated electronic fashion. In doing so, display 104 may have a list of the exact items associated with the payment confirmation. As seen in FIG. 6A, at least one RFID reader, combined with a plurality of directionally dispersed cameras with known machine learning techniques for item recognition, provide a check on item validation moving through the lane. Similarly, these cameras are used to read the payment verification, which in one embodiment, can be a QR, barcode, or numeric code that is displayed on display 104. This provides the automatic electronic payment and item validations that obviate the need to remove items or the need to position the user cell phone immediately next to a kiosk NFC or the like for payment interfacing as required by known systems. Unlike systems that use cameras (often combined with machine learning or AI techniques) for tracking the customer and the products that they may pick up (and which have unacceptably high rates of errors and incorrect pricing/quantity assessments associated with them), this approach to cameras is, in one embodiment, directed to confirming what is known to be the final purchase items and quantities. Likewise, FIG. 6B incorporates the above features, but further provides for a cart rail or the like, which may offer different angles of interfacing (and potentially more and/or different arrays of sensors in addition to the cameras) when compared to the fixed configuration described above in FIG. 6A. In either case, various sensors such as ultrasonic sensors, etc. may also be employed in one additional embodiment.

Figure 7:
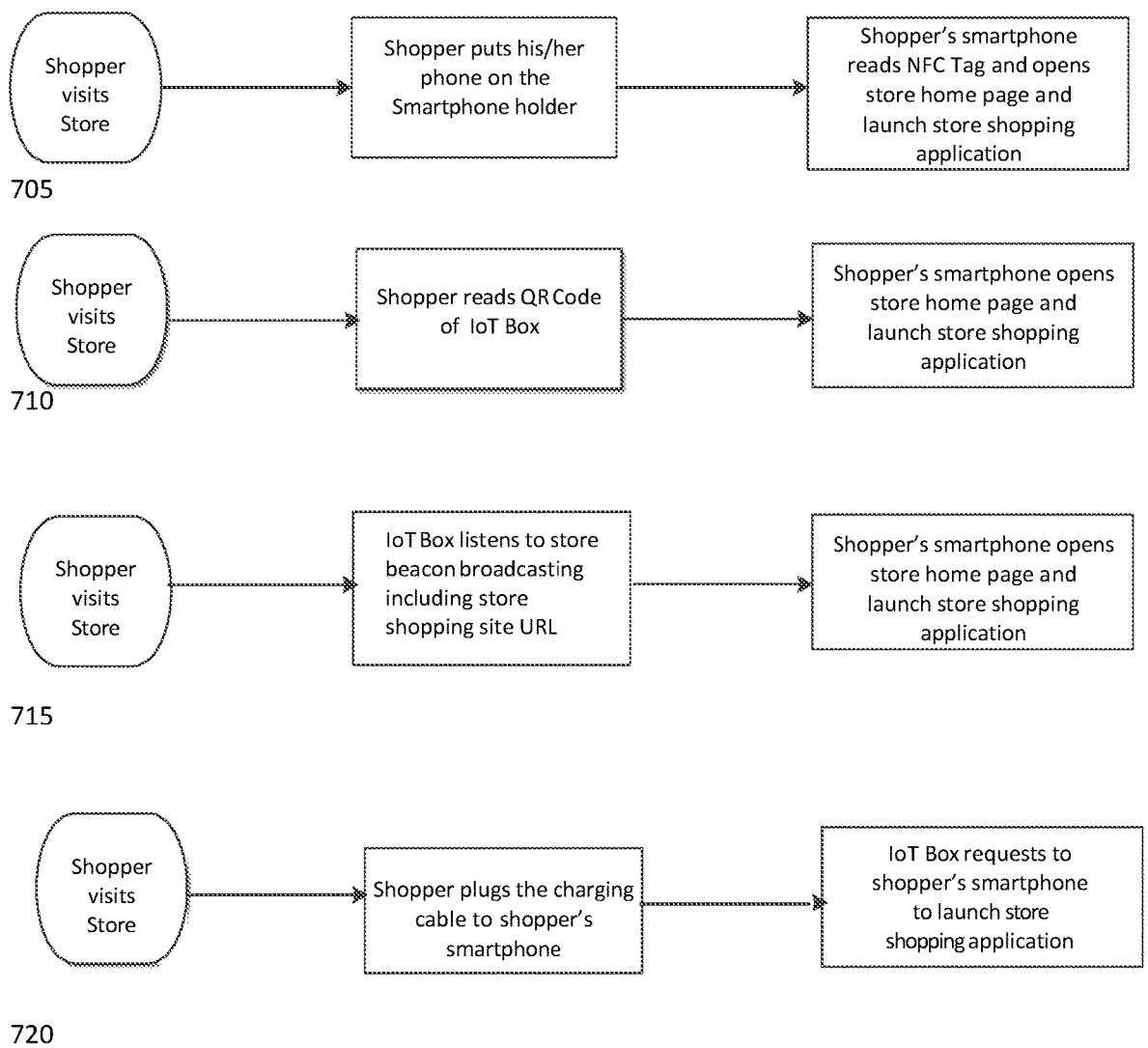
FIG. 7 shows a diagrammatic representation of the initial, central step in an overall self-checkout procedure according to one embodiment of the present invention, wherein a user is freed from the necessity of downloading a store app on to his mobile device when using the payment system.

FIG. 7 shows a diagrammatic representation of an initial, central step in an overall self-checkout procedure according to one embodiment of the present invention, wherein a user is freed from the necessity of downloading a store app on to his mobile device when using the payment system. By using the IoT box as an intermediary agent that launches a store app, it completely obviates the need for a reluctant user to download a store app. Obviously, should a use want to download an app, the system provided for herein can recognize that, and still provide for effectuation of the purchase as described. As seen specifically in FIG. 7, there are at least four variants on the above: (i) a process whereby the shopper puts their personal mobile device on the phone/device docking station 106 and the NFC tag is read, thereby launching the store app on display 104 (705); (ii) a process whereby the shopper reads the QR code of IoT box 100, which then opens the store app on display 104 (710); (iii) a process whereby IoT box 100 listens to a store BLE beacon, which then launches the store app on display 104 (715); and/or (iv) a process whereby the shopper plugs charging cable 108 (which can also double as a communications conduit between the two devices), thereby launching the store app on display 104 (720).

Before a user is freed from the necessity of downloading a store app on to his mobile device, however, it is first necessary to have the mobile device and IoT box pair with each other, illustratively through Bluetooth or BLE. There are two ways to do the pairing, whereby either the IoT box can initiate the pairing, or the user can initiate the pairing. A code generator (not depicted) for generating a code representing the unique identity of a user mobile device occurs upon receiving a pair completion signal a communications module when a communications module in IoT box 100 completes a pairing process with a user mobile device. Upon receiving either the code and/or a pairing completion signal, an automated shopping app launch module automatically initiates the launching and displaying of the given store app. Either way, IoT box 100 generates a code (illustratively a random number) to provide device information for pairing, but in such a way that provides privacy, yet offers the additional advantage of ease of use, given that this step is automated within IoT box 100 and does not require user involvement (other than enabling the user mobile device to accept the pairing offer by IoT box 100). In each case, and with reference to FIGS. 8A and 8B, the illustrative pairing steps might therefore involve:

Method 1—IoT Box device 100 initiates pairing, comprising the steps of: (1) IoT Box 100 displays on display 104 a QR Code which has a randomly generated number; (2) User reads this QR Code on display 104 IoT Box 100 via smartphone camera; (3) Customer smartphone starts an advertising with the random number; (4) IoT Box 100 requests a pairing with the random number; (5) Customer smartphone accepts a pairing request from KOAMTAC IoT Box and both are ready to connect each other.

OR

Method 2—User smartphone initiates pairing, comprising the steps of: (1) User downloads an auto pairing program from store; (2) User launches the application to displays a QR Code which has a random number; (3) User reads this QR Code via barcode scanner 102 that is in electronic communication with IoT Box 100; (3) IoT Box 100 starts an advertising with the random number; (4) Customer smartphone requests a pairing with the random number; (5) IoT Box 100 accepts a pairing request from user smartphone and both are ready to connect each other.

Thus, the service flow overall might look this: (1) User visits the store; (2) User takes IoT box 100 and puts into shopping cart, preferably utilizing cradle 150 with locking mechanism to retain IoT box 100 to cart; (3) User pairs smartphone with IoT box using various methods as described above, or in alternative embodiments, via either (a) a physical connection, such as through plugging a cable located on IoT Box 100 to the mobile device, or (b) wireless connection, by enabling mobile device Bluetooth, or by scanning a barcode on the IoT box 100, or by reading an NFC tag on IoT Box 100; (4) User can optionally lock the mobile device onto IoT box in the shopping cart cradle using either a shopping application or through a traditional locking method such as pin pad, finger print recognition, and physical lock; (5) User, or alternatively, IoT Box 100 automatically launches shopping application through technology such as: (a) Apple® Made for iPhone (MFI®) protocol enables automatic store shopping application launch upon plug in Apple connector such as 8 pin lightning connector; (b) NFC tag on IoT box launches store shopping website automatically; (c) store WiFi connection launches store shopping website automatically; (d) scanning store shopping site URL barcode, which in turn launches the store shopping website automatically; (e) through connection with a BLE beacon such as Android Eddystone®, which can in turn launch the shopping website; (6) User begins purchase steps by scanning the product barcode with mobile phone (or alternatively, scanner 102) in order to prepare for payment/self-checkout steps, noting that various shopping assistant services are in one embodiment called a Shopping Assistant feature, which may be integrated with BLE Beacon technology in order to provide services such as custom product information, personalized discount coupons, store navigation map and user location, etc.; (7) Payment and Self-checkout steps, which might involve: tallying up all of the scanned items from the previous step, and processing the payment (whether by making payment from the shopping application using registered credit card, or by making payment using payment application such as Alipay (non-credit card based electronic payment systems), etc., or by making payment using a credit card or other credit card based electronic payment tools such as Apple Pay, Google Pay, Samsung Pay, etc. if IoT box 100 is equipped with optional credit card payment unit; Payment barcode being displayed on IoT box 100 display 104; IoT box 100 detects self-checkout booth or self-checkout booth sensors, such as cameras etc. or RFID reader detects IoT box, and transmit shopped list to the store server; Self-checkout booth, being preferably equipped with camera and/or RFID technology, validates shopped items in the shopping cart; and finally, Users exits the self-checkout booth, returns IoT box 100 to charging station 190, and finishes shopping.

When conducting a sales transaction using IoT Box 100 as described above, the price of an item is normally encoded on a bar code or Ultra High Frequency (UHF) tag located on the item. However, in other embodiments, the electronic device IoT Box 100 may use the received identification information to query the price information. For example, the IoT Box 100 may transmit a SKU number to an external device, such as a server, to obtain the price information associated with that SKU number. Using the received identification information, the IoT Box 100 may determine a payment amount or amount due, which may be transmitted to user's mobile device, or may be retained in the absence of user mobile device being connected. IoT Box 100 may also receive payment information through the communication via store server (not depicted), and the payment information may include information to process payment for the item(s). For example, the payment information may include credit card information that has been swiped or inserted (chip read) by IoT credit card unit (if available, otherwise may be provided for separately at a kiosk in connection with the present system), or by registering a payment code (QR, etc.) generated by the electronic payments system (Google Pay®, AliPay®, ApplePay®, etc.) used. Upon receiving the authorization code or message, the IoT Box 100 may display a notification message on the display 104 alerting the merchant (automatically scanned in one embodiment by fixed cameras or the like at checkout exit lane) that the payment has been processed. In certain situations, an article may not properly ring up through scanning. For example, the UHF tag or the bar code may be damaged and unreadable. In these situations, the graphical element may be used to display a keypad for manually entering the article identification information. Keys or buttons representing numbers and letters may be used to enter identification information for an article. In certain embodiments, information displayed on the bar code or UHF tag may be entered through the virtual keypad. In other embodiments, the keypad may be used to enter the name or model number of an article, especially where the user does not have mobile phone. In any case, it is understood that because Radio Frequency Identification (RFID) tags are not completely accurate, in one embodiment both RFID validation is employed in conjunction with the above-referenced barcode scan, and may be further augmented with additional sensors for accuracy purposes.

Additionally, IoT box 100 in one embodiment as part of the Shopping Assistant referenced above, can use a fixed device number which any of the BLE beacons of the store IoT system (not depicted) can use (in conjunction with the backend store server) when determining the signal strength of IoT box for measuring the proximity of the shopper after pairing. This number may be used with the mobile pairing as a user token as an identifier to indicate the customer's presence in the shop and to allocate the user to the transaction requested by the cashier system and for product location finding services, or even in conjunction with user movement devices, such as Microsoft Kinect®. At least one BLE Beacon contained within IoT box 100 keeps broadcasting location information to store beacons or the like, and provides the respective customer's location to the store server. The Store server can in turn provide the aforementioned customized Shopping Assistant information to the customer's mobile device, or alternatively, to IoT Box 100 display 104. In doing so, various beacon standard such as Apple iBeacon® and Google EddyStone® may be employed, with BLE Angle of Arrival (AoA) and Angle of Departure (AoD) information, along with RSSI information, enhancing the accuracy of customer's location. Related to this, when the mobile device reaches a predefined proximity area of the casher system, e.g. an inner rim of a proximity beam thereof, the detector sensors may scan product identifying tags, such as RFID tags, attached to the shopping items of the user, and the store server device may confirm the payment for the shopping transaction in progress, and thus the scanned shopping items may be paid for by way of the mobile payment service, i.e. the respective accounts of the user/customer and the shop in the mobile payment service. Additionally, the user/customer may receive a receipt for the shopping transaction, either directly after the payment process or, especially in case of a lack of wireless connectivity to the server, at a later time after resumption of the wireless connectivity to the server, e.g. after leaving the building of the shop. The cashier system may open a physical gateway/gate for unblocking the lane such that the user/custom may leave the shop after the payment process.

According to one illustrative embodiment of the present invention, encryption may be provided by IoT box 100. In accordance therewith, any data transmission between any entities of the system described herein may or may not use encryption. Such encryption may be applied using common encryption standards, such as the Advanced Encryption Standard (AES), and point to point tunneling protocols, such as the Microsoft PPTP.

Figure 8A:
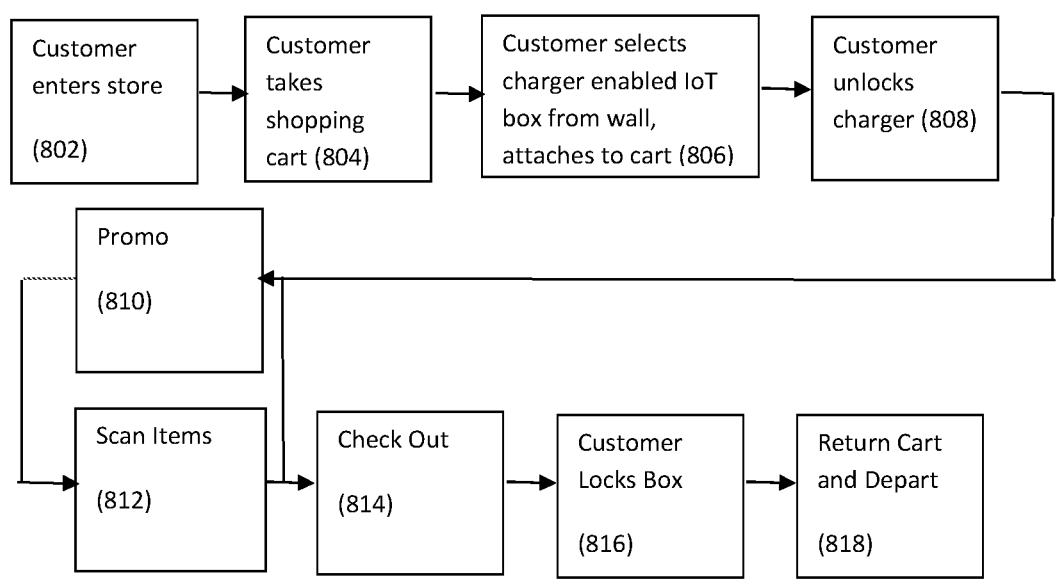
FIGS. 8A, 8B, 8C and 8D show general flow processes for pairing between a user and the IoT box device (or referred to in one additional embodiment as a handheld portable charging point device), depending on which one initiated the pairing process.
Figure 8B:
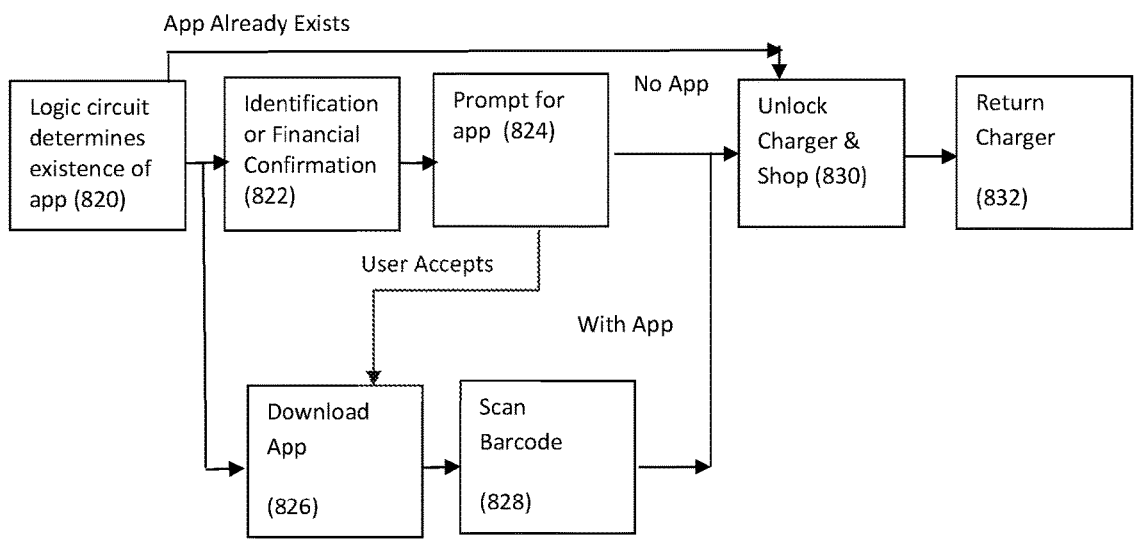
Figure 8C:
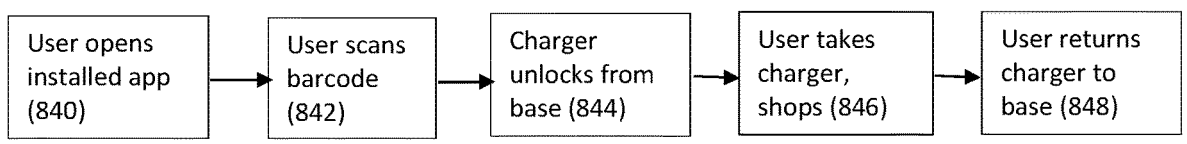
Figure 8D:
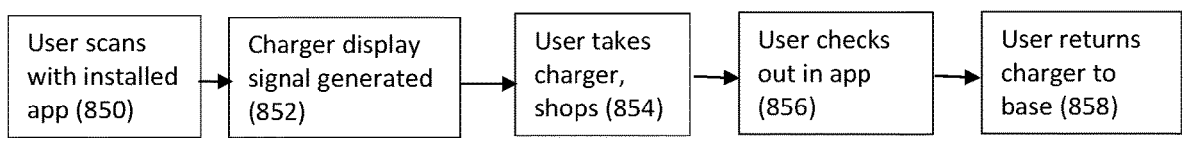

FIGS. 8A-8D detail illustrative user employment flows for an additional embodiment within the overall inventive system concept. As depicted in FIG. 8A, at the high level, one user initiated process begins when a user walks into a store or other commercial establishment 802, and optionally proceeds to procure a shopping cart with a charger receiving attachment, and proceeds to a charger wall 806, where the user can take a handheld portable charging point device 902 (or alternatively, IoT box 100 in the above described embodiment) by unlocking the handheld portable charging point device 902 from a recharging receptacle 904 of a charging station where recharging receptacle 904 has been charging handheld portable charging point device 902 through an interface such as a power outlet, wireless charging and/or a wired electronic contact point. Any promotions 810 are launched, and thereafter, items are scanned 812 for checkout 814. Process is complete by customer locking 816 handheld portable charging point device 902 prior to departure form store 818. An anti-theft proximity sensor can be embedded so that of handheld portable charging point device 902 is not inadvertently or purposely removed from the store premises. Similar process as detailed above may be implemented for consumer who already possess the store app (as determined at 820 in FIG. 8B), with follow on processes in FIG. 8C evidenced in steps 822-828), and subsequent processed for existing app users to scan a barcode 842, for unlocking 844 of handheld portable charging point device 902, as well as processes for charger initiation at 852, as seen in FIG. 8D.

In an additional illustrative embodiment, mobile phone docking station 106 or user mobile device recharge interface 914 of handheld portable charging point device 902 includes circuitry (not depicted) for variable speed charging options, which can allow for at least two or more fast charging vs. slow charging settings depending on user identity and/or actions. For example, a VIP user or perhaps even just users who have opted in to a download of a preferred ap on their mobile decide, once identified might be permitted to use (one of) the fast charging option(s) instead of the slower charge option(s). The ability to permit the proprietor designated charging options is therefore driven by service logic according to such desired preferences, and the internal circuitry can be pre-programmed with code to effectuate the same. Effectively, a logic gate switches the session usage flow through one of two (or more) faster or slower charging paths. The structure of the circuitry used in providing faster vs. slower charging options is illustratively, as follows in an exemplary USB wired charging embodiment: (1) Slower charging option—employs the basic USB specification which only sends 0.5 amps (A) of current using 5 volts (V) at just 2.5 watts (W); (2) Faster charging option—employs the USB Power Delivery option which operates at 7.5+W, or even 15+W, although this may vary depending on the implementation of similar regimes, such as Qualcomm, Inc. Quick Charge, Huawei, Inc. Super Charge, Oppo, Inc. VOOC, Motorola, Inc. Turbo Power, OnePlus Inc. Warp Charge, etc. Within the above illustrative variable speed charging frameworks, other wired, as well as wireless (inductive) charging schemes are explicitly contemplated and, as one skilled in the art can understand, are readily deployable within the overall novel system.

Figure 9A:
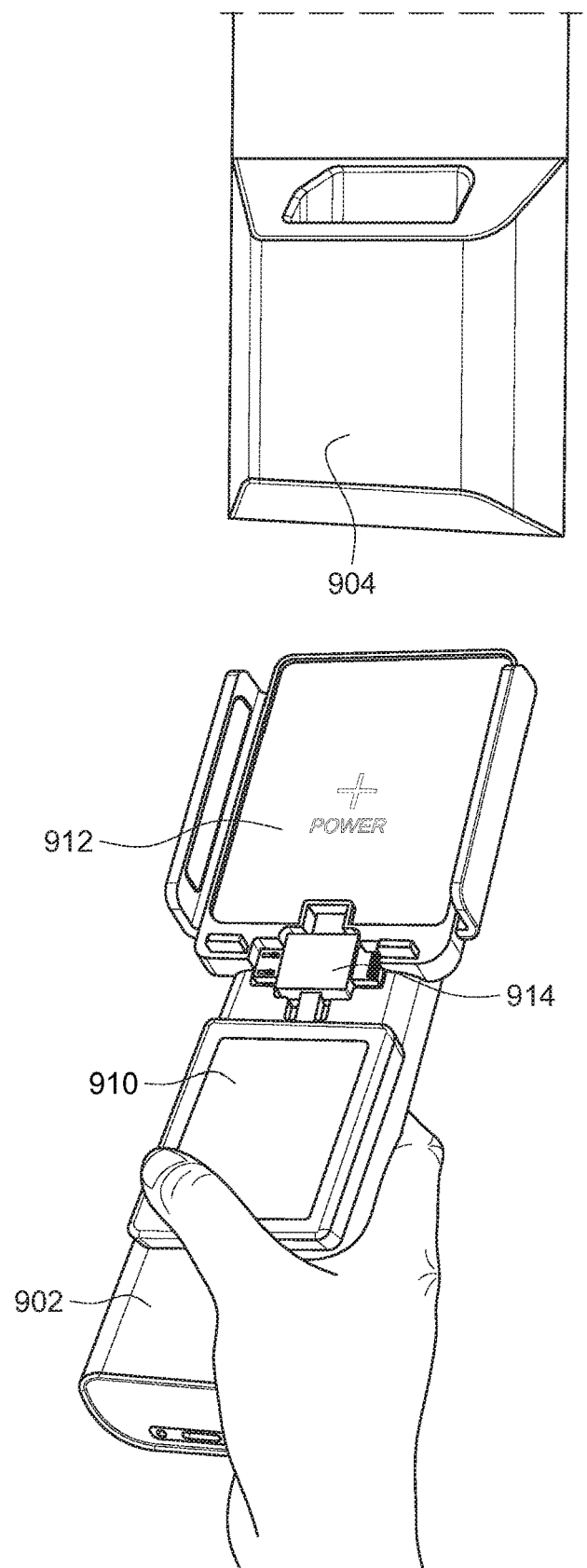
FIGS. 9A, 9B and 9C depict an illustrative showing of the inventive mobile device in-store charging system, including an exemplary charger, charging station, and interface with a user mobile device in one type of situational usage.
Figure 9B:
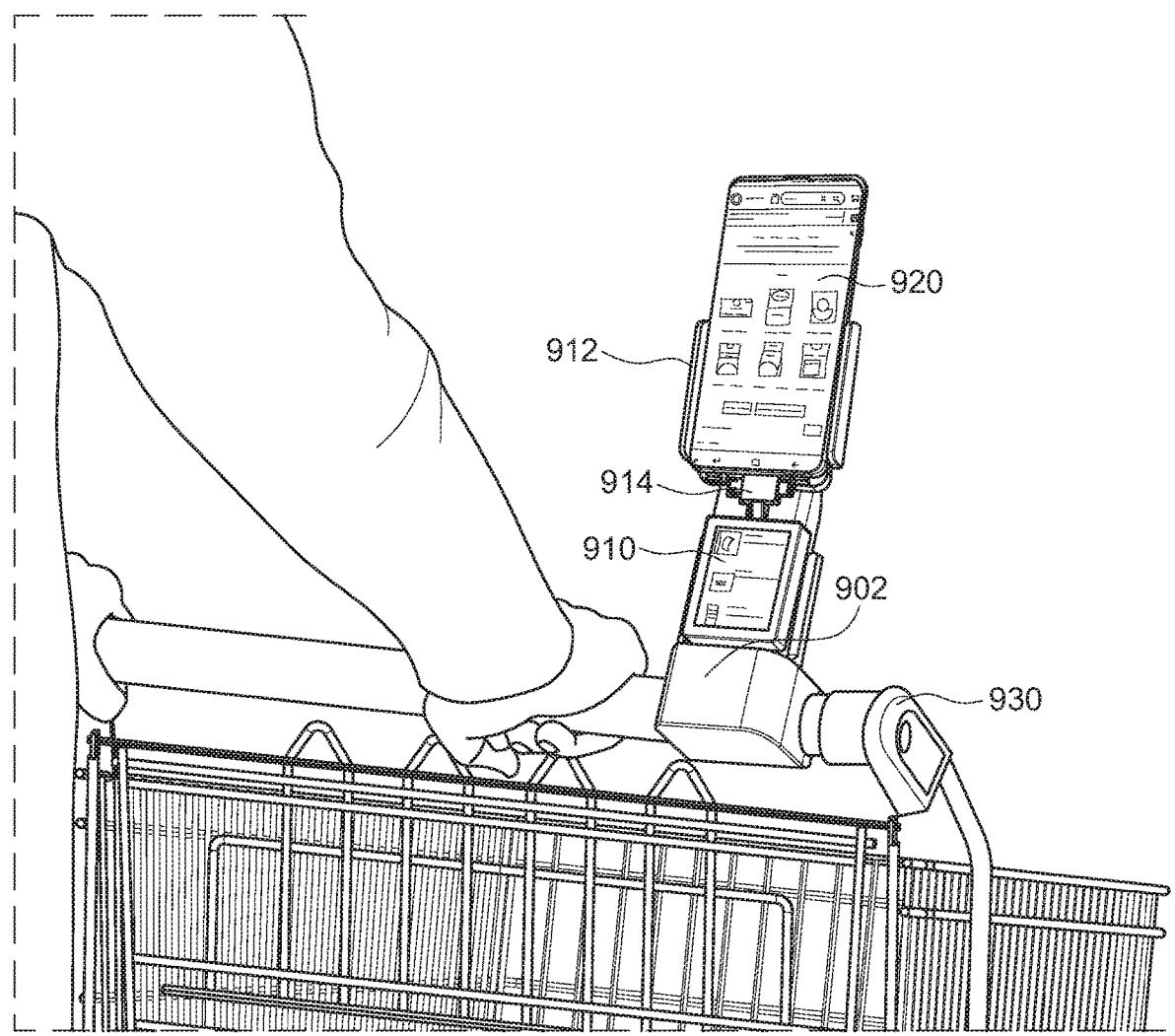
Figure 9C:
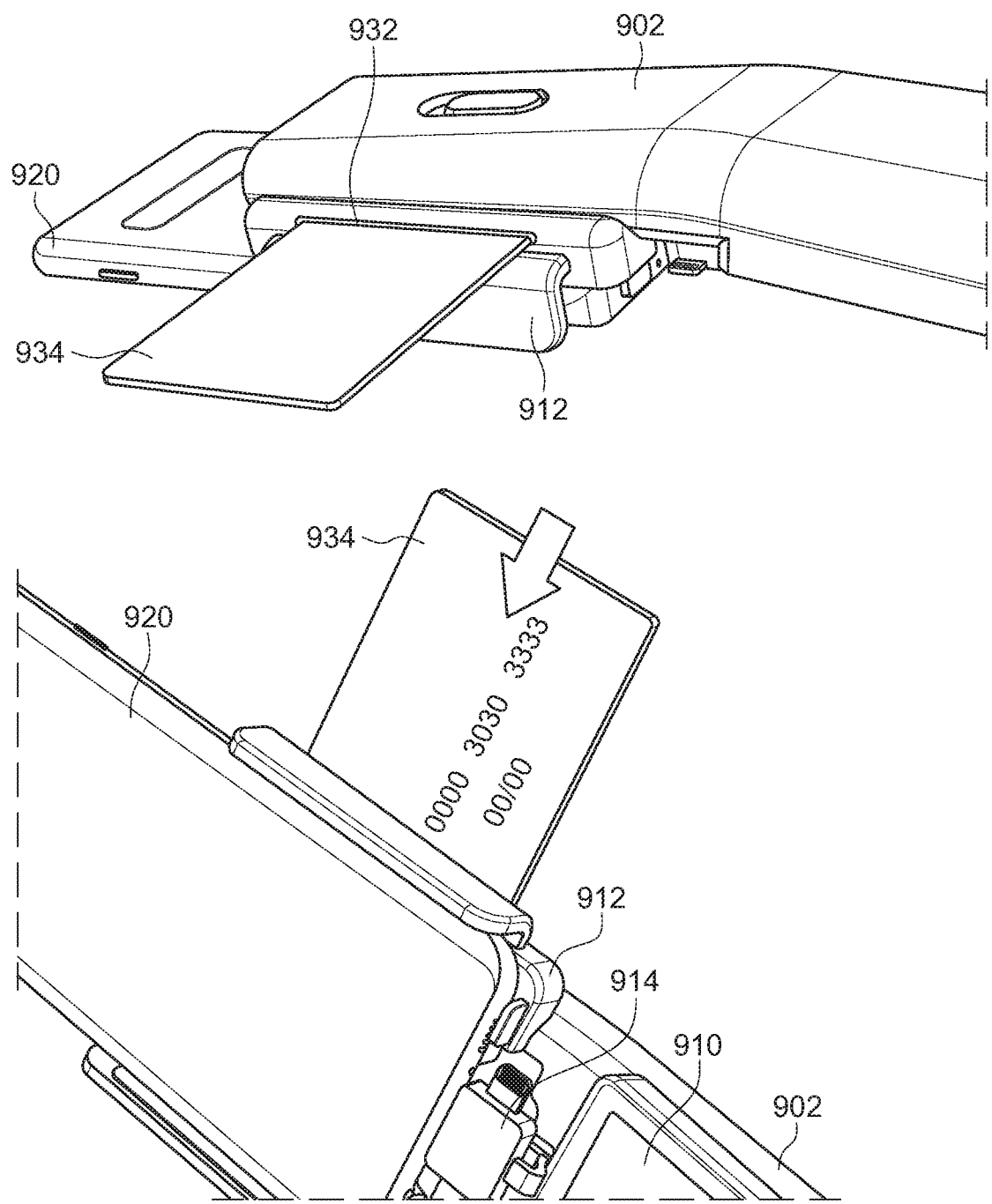

As depicted in FIGS. 9A-9C, an illustrative handheld portable charging point device 902 may be charged in various ways as described herein in other embodiments, or as illustrated here, through charging interface 904 (depicted in FIG. 9A as a charging station that can host or dock handheld portable charging point device 902. Handheld portable charging point device 902 may include screen 910, mobile device retention structure 912 for holding or retaining user mobile device 920, a rechargeable battery (not depicted) affixed or contained within the versatile casement structure, and user mobile device recharge interface 914, which may be wireless (induction) or wired, and may optionally double as a communications conduit between the two devices. As seen in FIG. 9C, additional provision may be made for payment interface 932 which may be one or more of the following of a physical credit card processing interface (depicted here, with illustrative credit card 934) and/or a virtual payment interface displayed on electronic display 910 or user mobile device 920.

The "versatile" aspect of the casement structure has been discussed elsewhere herein, but one additional feature of the particular embodiment is the ability to make the casement truly portable by having an elongated profile with overall dimensions that it can be held by human hands of various shapes (as depicted in FIG. 9A), yet at the same time, has a quick affixment "snap-on" type feature so that it can be readily snapped onto a mechanical structure such as a native in-store basket or cart 930, as depicted in FIG. 9B. Additional optional provision within the "versatile" novelty may be made for unique features that modern shoppers will find attractive. For instance, affixed to or integral to the versatile casement structure, bio sensors of various types may be provided so that shoppers can have convenient access to health monitoring while they shop. For example, such bio-sensors may include fitness monitors, glucose and oxygen monitoring, temperature, etc., as may be already available commercially, but adapted to, and for usage with, handheld portable charging point device 902. Also, because many modern shoppers are concerned about bacteria laden store surfaces (such as shopping cart handles which are often disinfected using store-provided anti-bacteria wipes), provision may be made for impregnating the plastic that forms the versatile casement with anti-bacterial properties that inhibit microbial growth, such as impregnation with silver ions or other adjuncts as may be known in the art.

One further embodiment may provide for an optional "green charging" system which utilizes the motion of an accompanying shopping cart 930 upon which handheld portable charging point device 902 has been placed, to charge the rechargeable battery of handheld portable charging point device 902 and/or directly charges user mobile device 920 when it is held by the same. At its broadest level, the "green charging" feature utilizes the motion of the wheels (not depicted) of shopping cart 930, as it is pushed by a shopper, to generate and harvest electricity that can be transmitted via a cart charge wire (not depicted) to the rechargeable battery of handheld portable charging point device 902 and/or user mobile device 920. Shoppers with an interest in energy saving and "eco" devices may be interested in utilizing this optional embodiment where provided by a given store. In order to do so, the user can select this option, via either a mechanical switch (not depicted) or via a "virtual switch" app which instructs handheld portable charging point device 902 to bypass or alternatively, augment the rechargeable battery within, so that the electricity generated from the green charging can be directed to the present recharging setup.

By way of further structural description, the green charging system is electrically connected handheld portable charging point device 902 and may physically generate electricity through the rotational movement of the wheels of shopping cart 930 utilizing piezoelectric-based, magnetic field based, or other types of electric generation devices. For illustrative purposes, U.S. Pat. No. 6,016,022, titled "Electricity Generating System for Bicycle", filed on Jan. 18, 2000 by Cho, as well as U.S. Pat. No. 6,002,187, titled "Bicycle Electricity Generator and a Method of Attaching the Electricity Generator to a Bicycle", filed on Dec. 14, 1999 by Ohkura, both detail harvesting electricity generated by wheel rotation. Although the present invention is not meant to be limited to any of the technologies described by these present publications, both of these patents are hereby explicitly incorporated by reference in their entireties.

The foregoing description of the examples, including graphically illustrated examples, of the disclosed subject matter has been presented only for the purpose of illustration and description and is not intended to be exhaustive or to limit the subject matter to the precise forms disclosed. Numerous modifications, adaptations, and uses thereof can be apparent to those skilled in the art without departing from the scope of this subject matter. The illustrative examples described above are given to introduce the reader to the general subject matter discussed here and are not intended to limit the scope of the disclosed concepts.

The invention claimed is:

1. A handheld portable point of purchase device, comprising:
   (a) a versatile casement structure;
   (b) a scanner attached to said versatile casement structure;
   (c) an electronic display;
   (d) a communications module, said communications module having at least one of the following of:
      (i) a near field communication (NFC) device configured to sense connection to neighboring NFC-enabled articles and to acquire identification information from one or more NFC-tagged articles;
      (ii) a Bluetooth® Low Energy (BLE) interface configured to sense connection to neighboring BLE beacons;
      (iii) a wireless connection module configured to connect via WiFi, Bluetooth, or via cellular connection; or
      (iv) a wired connection;
   (e) a code generator for generating a code for a user mobile device upon receiving a pair completion signal from said communications module when said communications module completes a pairing process with a user mobile device;
   (f) an automated shopping app launch module having specialized circuitry for automatically initiating, upon receipt of said code, and thereafter, displaying on said electronic display, a given shopping app and for interfacing with said user mobile device via said communications module and for obviating the need to download said app on a customer mobile device.

2. The handheld portable point of purchase device of claim 1, further comprising:
   (g) a processor in electronic connection with said scanner, said electronic display, and said communications module, said processor configured to:
      (i) transmit and receive product identification and payment information to and from an external server in a remote location and a connected mobile device;
      (ii) retrieve electronic commerce information for a given market and display it on said electronic display;
   (h) a payment module in connection with said communications module, said payment module being configured to:
      (i) receive and transmit transaction information to an external device based on said product identification information; and
      (ii) receive a transaction authorization based on said transaction information;
      (iii) display, on said display, said transaction authorization.

3. The device of claim 2, wherein said external device is selected from the group comprising: a manual payment kiosk, a user mobile phone, or a server.

4. The device of claim 3, wherein said casement structure includes a mobile phone docking station that includes at least one of the following of: a mobile phone holder; a wireless charging station; or a wired charging station.

5. The device of claim 4, wherein said communications module includes a shopper location module, said shopper location module including circuitry directed to at least one of the following of Beacon triangulation effectuation, WiFi triangulation location effectuation, Beacon RSSI signal including Arrival: (AoA) and Angle of Departure (AoD) information based location determination, or Global Positioning Satellite (GPS) triangulation location effectuation.

6. The device of claim 5, wherein said device is in electronic communication with a self-checkout system, comprising:
   (a) a cart and payment validation station;
   (b) a proximity system in electronic communication with said cart and payment validation station, said proximity system configured to:
      (i) electronically connect with a mobile device of a user of a mobile payment service in the proximity of said device, and to communicate with the mobile device upon detection of mutual proximity, wherein the user of the mobile device is a customer;
      (ii) electronically recognize shopping items of said customer when in proximity of cart and payment validation station, and to generate shopping information, including at least one of a shopping basket content and a total amount of the recognized shopping items; and
      (iii) validate payment information via at least one of the following of said mobile device or said display.

7. The device of claim 6, wherein said mobile phone docking station includes circuitry, for variable speed charging options.

8. A handheld portable charging point device, comprising:
   (a) a versatile casement structure;
   (b) a mobile device retention structure connected to said versatile casement structure;
   (c) a rechargeable battery;
   (d) a user mobile device recharge interface;
   (e) a charging interface for variable speed charging said handheld portable charging point device, wherein said charging interface is selected from the group comprising a charging station, a power outlet, or a wired electronic contact point;
   (f) an anti-theft device, said device chosen from the group comprising a proximity based anti-theft alarm sensor based system, and a lock, said lock releasing upon receipt of a verified electronic signal generated by said handheld portable charging point device or a user mobile device;
   (g) an electronic display attached to said versatile casement structure;

(h) a payment interface attached to said versatile casement structure, wherein said payment interface is selected from the group comprising: a physical credit card processing interface or a virtual payment interface displayed on said electronic display;
(i) a scanner attached to said versatile casement structure;
(j) a communications module, said communications module having at least one of the following of:
   (i) a near field communication (NFC) device configured to sense connection to neighboring NFC-enabled articles and to acquire identification information from one or more NFC-tagged articles;
   (ii) a Bluetooth® Low Energy (BLE) interface configured to sense connection to neighboring BLE beacons;
   (iii) a wireless connection module configured to connect via WiFi, Bluetooth, or via cellular connection; or
   (iv) a wired connection;
(k) a code generator for generating a code for a user mobile device upon receiving a pair completion signal from said communications module when said communications module completes a pairing process with a user mobile device;
(l) an automated shopping app launch module having specialized circuitry for automatically initiating, upon receipt of said code, and thereafter, displaying on said electronic display, a given shopping app and for interfacing with said user mobile device via said communications module and for obviating the need to download said app on a customer mobile device.

* * * * *